United States Patent
Crawley

(10) Patent No.: US 7,853,830 B2
(45) Date of Patent: Dec. 14, 2010

(54) APPARATUS AND METHOD FOR PROVIDING ERROR NOTIFICATION IN A WIRELESS VIRTUAL FILE SYSTEM

(75) Inventor: Casimir Johan Crawley, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 497 days.

(21) Appl. No.: 11/982,195

(22) Filed: Nov. 1, 2007

(65) Prior Publication Data

US 2008/0109685 A1     May 8, 2008

Related U.S. Application Data

(60) Provisional application No. 60/856,680, filed on Nov. 3, 2006.

(51) Int. Cl.
    *G06F 11/00* (2006.01)
(52) U.S. Cl. .......................... 714/42; 714/48
(58) Field of Classification Search ........................ None
    See application file for complete search history.

(56) References Cited

U.S. PATENT DOCUMENTS

| | | | |
|---|---|---|---|
| 2002/0103783 A1* | 8/2002 | Muhlestein | 707/1 |
| 2004/0044913 A1* | 3/2004 | Wu | 713/202 |
| 2004/0193993 A1 | 9/2004 | Roy et al. | |
| 2005/0144353 A1 | 6/2005 | Long et al. | |
| 2005/0276092 A1 | 12/2005 | Hansen et al. | |
| 2006/0007126 A1 | 1/2006 | Shih | |
| 2006/0068638 A1 | 3/2006 | Lin et al. | |
| 2007/0088981 A1* | 4/2007 | Noble et al. | 714/26 |
| 2008/0056257 A1* | 3/2008 | Furukawa et al. | 370/390 |
| 2008/0095128 A1* | 4/2008 | Fong | 370/338 |
| 2008/0109685 A1* | 5/2008 | Crawley | 714/48 |
| 2008/0130517 A1* | 6/2008 | Lee et al. | 370/254 |
| 2008/0294742 A1* | 11/2008 | Huotari et al. | 709/206 |
| 2009/0037520 A1* | 2/2009 | Loffredo | 709/203 |
| 2009/0081962 A1* | 3/2009 | Sohrabi | 455/79 |

FOREIGN PATENT DOCUMENTS

GB     2410160     7/2005

(Continued)

OTHER PUBLICATIONS

N. Cravotta: "Device connectivity: a whole new set of secret handshakes"; EDN, Jan. 6, 2000, pp. 113-116.

*Primary Examiner*—Michael C Maskulinski
(74) *Attorney, Agent, or Firm*—Robert D. Shedd; Joseph J. Opalach; Reitseng Lin

(57) ABSTRACT

An apparatus (20) provides a dynamically-generated audio and/or video error file upon the occurrence of an error condition in a wireless virtual file system (100). According to an exemplary embodiment, the apparatus (20) includes a host interface (22) for connecting to a host device (10) and a network interface (30) for connecting to a wireless network (40). A controller (24) is coupled to the network interface (30) for retrieving a name of a file stored in a storage device (50) connected to the wireless network (40), and is coupled to the host interface (22) for transmitting the name of the file to the host device (10). If no name is retrieved, the controller (24) transmits a signal indicating an error condition.

18 Claims, 3 Drawing Sheets

FOREIGN PATENT DOCUMENTS

| | | |
|---|---|---|
| NO | 318168 | 2/2005 |
| TW | 228894 | 3/2005 |
| WO | WO 2004/055738 | 7/2004 |
| WO | WO 2005/043841 | 5/2005 |
| WO | WO 2006/099588 | 9/2006 |

\* cited by examiner

APPARATUS AND METHOD FOR PROVIDING ERROR NOTIFICATION IN A WIRELESS VIRTUAL FILE SYSTEM

CROSS REFERENCE TO RELATED APPLICATION

This application claims priority to and all benefits accruing from a provisional application filed in the United States Patent and Trademark Office on Nov. 3, 2006, and there assigned Ser. No. 60/856,680.

BACKGROUND OF THE INVENTION

1. Field of the Invention

The present invention relates to an apparatus and method for providing a dynamically-generated audio and/or video error file upon the occurrence of an error condition in a wireless virtual file system. A host device can play back this error file for error notification and resolution guidance.

2. Background Information

Wireless virtual storage apparatuses, such as Universal Serial Bus (USB) Mass Storage Class (MSC) wireless dongles, are generally known in the art. These apparatuses may be used in networks, such as Universal Plug and Play (UPnP) networks, to provide audio and/or video content to host devices to which they are connected. In an UPnP network, a combination of a wireless virtual storage apparatus and a host device operates as a media renderer and control point, while storage devices in the network operate as audio and/or video content providers. An example of a conventional wireless virtual storage apparatus is disclosed in U.S. Patent Publication No. 2005/0144353.

With conventional wireless virtual storage apparatuses, a problem arises for example when no storage device in the network is discovered and/or when no content is located. In such instances, no notification or resolution process exists that can alert a user to the error condition or guide the user towards a solution.

Accordingly, there is a need in the art to address the foregoing problem. The present invention described herein addresses this and/or other problems and discloses an apparatus and method which provides a dynamically-generated audio and/or video error file upon the occurrence of an error condition in a wireless virtual file system. A host device can play back this error file for error notification and resolution guidance.

SUMMARY OF THE INVENTION

In accordance with an aspect of the present invention, a wireless virtual storage apparatus for use in a wireless virtual file system is disclosed. According to an exemplary embodiment, the apparatus comprises means such as a host interface for connecting to a host device, and means such as a network interface for connecting to a wireless network. Means such as a controller is coupled to the network interface for retrieving a name of a file stored in a storage device connected to the wireless network, and is coupled to the host interface for transmitting the name of the file to the host device. If no name is retrieved, the controller transmits a signal indicating an error condition.

In accordance with another aspect of the present invention, a method for providing an error notification in a wireless virtual file system is disclosed. According to an exemplary embodiment, the method comprises steps of connecting to a host device through a host interface and to a wireless network through a network interface; retrieving through said network interface a name of a file stored in a storage device connected to said wireless network, and transmitting said name of said file to said host device through said host interface; and wherein if no name is retrieved, transmitting a signal indicating an error condition to said host device through said host interface.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Figure 1:
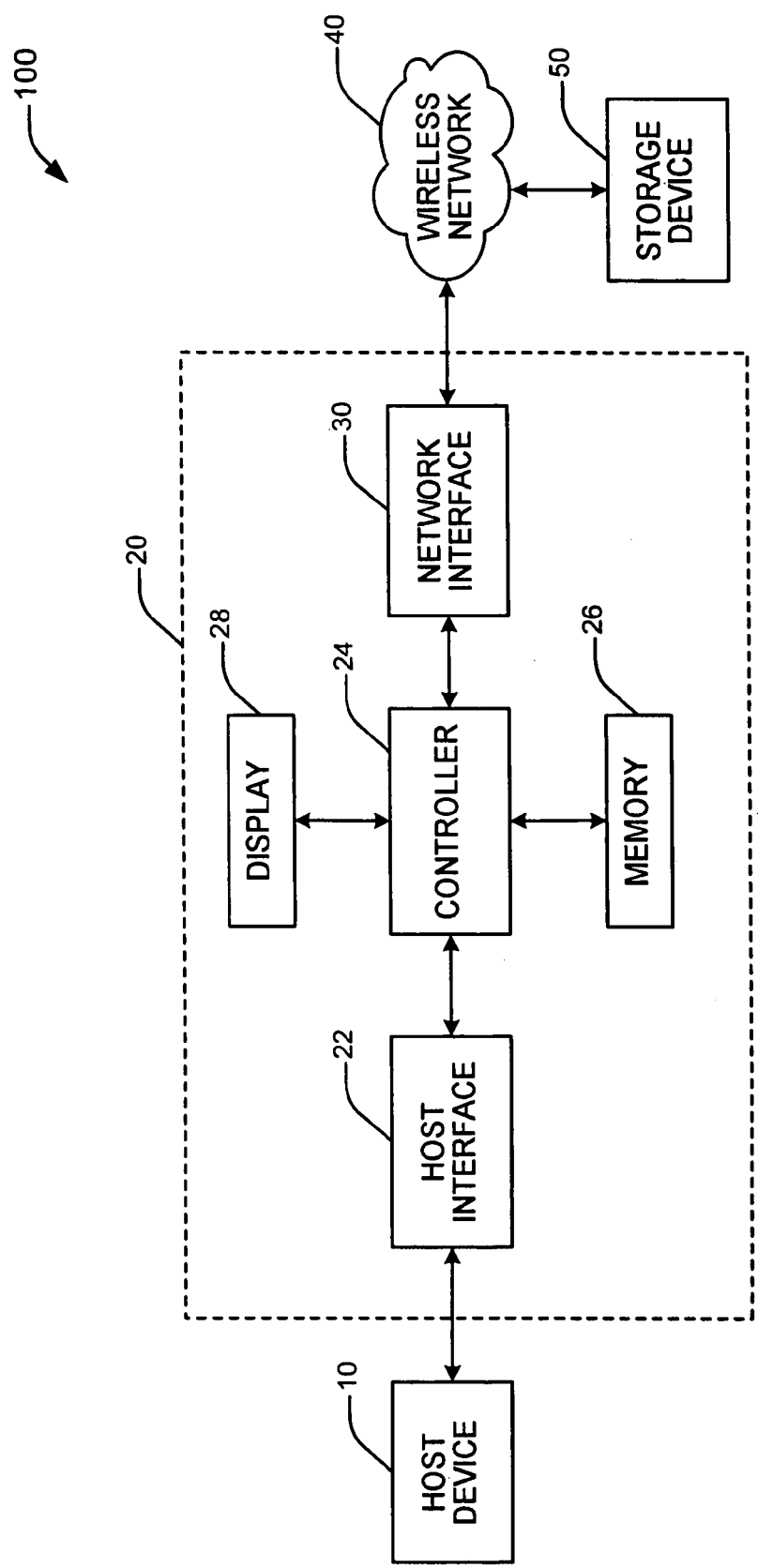
FIG. 1 is a diagram of a wireless virtual file system according to an exemplary embodiment of the present invention.

Referring now to the drawings, and more particularly to FIG. 1, a wireless virtual file system 100 according to an exemplary embodiment of the present invention is shown. As indicated in FIG. 1, wireless virtual file system 100 comprises a host device 10, a wireless virtual storage apparatus 20, a wireless network 40 and one or more storage devices 50. According to an exemplary embodiment, wireless virtual storage apparatus 20 comprises a host interface 22, a controller 24, a memory 26, a display 28 and a network interface 30. Some of the foregoing elements of wireless virtual storage apparatus 20 may be implemented using one or more integrated circuits (ICs). According to an exemplary embodiment, wireless virtual file system 100 may represent an UPnP network.

Host device 10 is operative to provide audio and/or video outputs and may for example be embodied as a personal computer, audio shelf system and/or any other type of device that is capable of providing audio and/or video outputs. According to an exemplary embodiment, host device 10 includes an interface, such as a USB interface, (not shown) that enables host device 10 to communicate with wireless virtual storage apparatus 20. Wireless virtual storage apparatus 20 presents itself to host device 10 as a single storage device, for example, a single hard drive.

Wireless virtual storage apparatus 20 is operative as a translational bridge between host device 10 and one or more storage devices 50 via wireless network 40. Wireless virtual storage apparatus 20 may also be referred to as a wireless dongle. The individual elements of wireless virtual storage apparatus 20 will hereinafter be described.

Host interface 22 is operative as a communication interface between wireless virtual storage apparatus 20 and host device 10. According to an exemplary embodiment, host interface 22 may be implemented as a USB interface.

Controller 24 is operative to provide various control and processing functions of wireless virtual storage apparatus 20.

According to an exemplary embodiment, controller 24 is operative to detect various different types of error conditions associated with wireless virtual file system 100, and to provide error files associated with these error conditions to host device 10 via host interface 22. In this manner, controller 24 performs various functions that provide error notification and resolution guidance according to principles of the present invention. Further details regarding the functionality of controller 24 will be provided later herein.

Memory 26 is operative to provide data storage functions of wireless virtual storage apparatus 20. According to an exemplary embodiment, memory 26 is operative to store data including software code which enables controller 24 to perform its various control and processing functions. Memory 26 is also operative to store error files that provide error notification and resolution guidance for various different types of error conditions detected within wireless virtual file system 100.

Display 28 is operative to provide visual displays for wireless virtual storage apparatus 20. According to an exemplary embodiment, display 28 is an optional element of wireless virtual storage apparatus 20 which may or may not be included as a matter of design choice.

Network interface 30 is operative as a communication interface between wireless virtual storage apparatus 20 and wireless network 40. According to an exemplary embodiment, network interface 30 is operative to receive files such as audio, video, image and/or text files stored on one or more storage devices 50 via wireless network 40.

Figure 2:
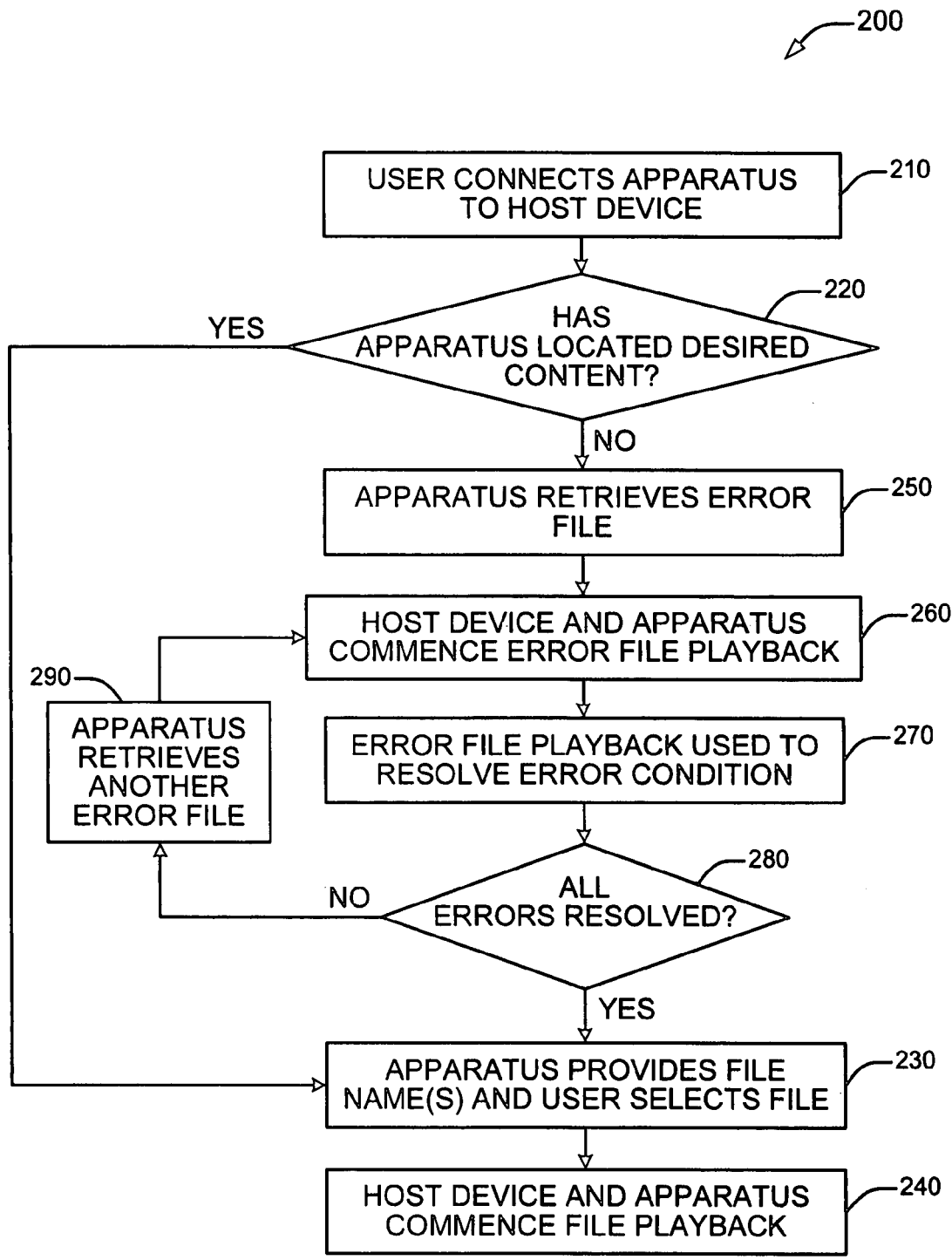
FIG. 2 is a flowchart illustrating steps for providing an error notification in a wireless virtual file system according to an exemplary embodiment of the present invention.

Referring now to FIG. 2, a flowchart 200 illustrating steps for providing an error notification in a wireless virtual file system according to an exemplary embodiment of the present invention is shown. For purposes of example and explanation, the steps of FIG. 2 will be described with reference to wireless virtual file system 100 of FIG. 1. The steps of FIG. 2 are exemplary only, and are not intended to limit the present invention in any manner.

At step 210, a user connects wireless virtual storage apparatus 20 to host device 10. According to an exemplary embodiment, a user physically connects wireless virtual storage apparatus 20 to host device 10 at step 210 via a cable, such as a USB cable, which connects to host interface 22 of wireless virtual storage apparatus 20 and an interface (not shown in FIGS.) of host device 10.

At step 220, wireless virtual storage apparatus 20 determines whether desired content has been located within wireless virtual file system 100. According to an exemplary embodiment, controller 24 of wireless virtual storage apparatus 20 makes the determination at step 220 based on information received from wireless network 40 via network interface 30. According to one exemplary embodiment, controller 24 causes wireless virtual storage apparatus 20 to immediately begin searching for all available content (e.g., all audio, video, image and/or text files) within wireless virtual file system 100 in response to being connected to host device 10 at step 210. According to this exemplary embodiment, any content located within wireless virtual file system 100 is deemed to be desired content at step 220, and the determination at step 220 is positive if controller 24 is able to retrieve the name of at least one audio and/or video file from storage device(s) 50. Conversely, the determination at step 220 is negative according to this exemplary embodiment if controller 24 is unable to retrieve the name of at least one audio and/or video file from storage device(s) 50.

According to another exemplary embodiment, controller 24 causes wireless virtual storage apparatus 20 to search for only one or more user specified types of content (e.g., only text files, only PDF files, only JPEG files, only MP3 files, only JPEG and MPEG-2 files, etc.) within wireless virtual file system 100 after being connected to host device 10 at step 210. According to this exemplary embodiment, a user may provide inputs via host device 10 to specify the desired type of content. In response to these inputs, controller 24 causes wireless virtual storage apparatus 20 to search for only the user specified type(s) of content in order to make the determination at step 220. According to this exemplary embodiment, the determination at step 220 is positive if controller 24 is able to retrieve from storage device(s) 50 the name of at least one file of the type(s) specified by the user. Conversely, the determination at step 220 is negative according to this exemplary embodiment if controller 24 is unable to retrieve from storage device(s) 50 the name of at least one file of the type(s) specified by the user.

If the determination at step 220 is positive, process flow advances to step 230 where wireless virtual storage apparatus 20 provides the file name(s) corresponding to the desired content to host device 10 and a user is able to select a desired file. According to an exemplary embodiment, controller 24 causes wireless virtual storage apparatus 20 to provide the file name(s) corresponding to the desired content to host device 10 via host interface 22 at step 230. The user then selects a desired file at step 230 via an on-screen display that lists by name the one or more audio and/or video files corresponding to the desired content. In this manner, the user may select (e.g., click on, etc.) a desired audio and/or video file for output via host device 10.

Next, at step 240, host device 10 and wireless virtual storage apparatus 20 commence playback of the file selected at step 230. According to an exemplary embodiment, controller 24 causes wireless virtual storage apparatus 20 to retrieve content corresponding to the selected file from storage device(s) 50 via network interface 30 and provide the retrieved content to host device 10 via host interface 22 at step 240. In this manner, the content corresponding to the selected file may be output via host device 10.

Referring back to step 220, if the determination at step 220 is negative (i.e., desired content has not been located within wireless virtual file system 100), process flow advances to step 250 where wireless virtual storage apparatus 20 retrieves an error file indicating an error condition. According to an exemplary embodiment, controller 24 performs step 250 by retrieving from memory 26 an error file corresponding to the detected error condition. According to another exemplary embodiment, controller 24 may retrieve the error file at step 250 from a source other than memory 26. For example, assuming wireless network 40 is available, controller 24 may retrieve the error file at step 250 from storage device(s) 50. In yet another embodiment, controller 24 may create an appropriate error file and save it in memory 26.

Next, at step 260, host device 10 and wireless virtual storage apparatus 20 commence play back of the error file retrieved at step 250. According to an exemplary embodiment, controller 24 causes wireless virtual storage apparatus 20 to provide the retrieved error file to host device 10 at step 260 by transmitting a signal representing the retrieved error file to host device 10 via host interface 22. According to this exemplary embodiment, host device 10 receives the error file and provides an on-screen display that includes a representation (e.g., icon, etc.) of the error file, thereby notifying a user of the error condition. An example of such an on-screen display is shown in FIG. 3.

Figure 3:
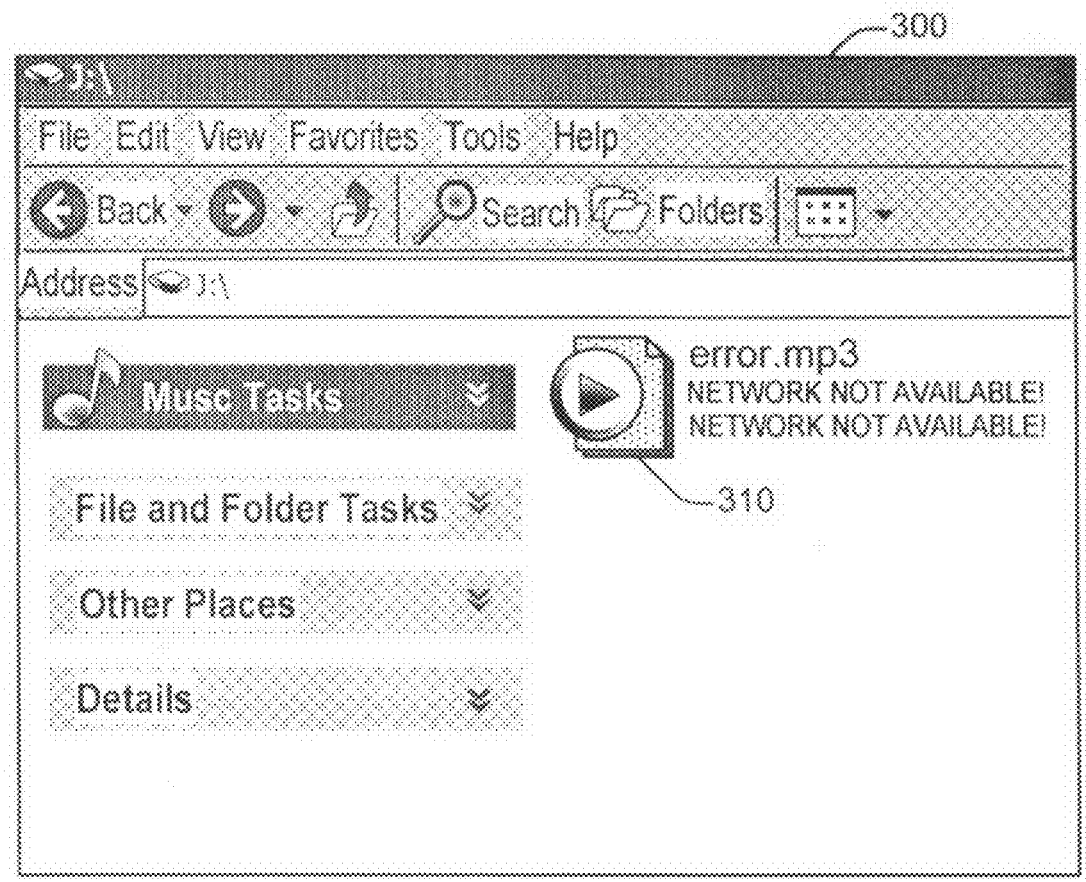
FIG. 3 is an on-screen display providing an error notification according to an exemplary embodiment of the present invention.

As indicated in FIG. 3, on-screen display 300 includes an iconic representation 310 of the error file. Icon representation 310 of FIG. 3 also indicates a reason for the error condition, namely, that wireless network 40 is not available. Other reasons for the error condition (e.g., no files located, desired file(s) not available, etc.) may also be provided depending on the circumstances. By selecting (e.g., clicking on, etc.) the iconic representation 310 of the error file, the user may be provided with additional information regarding the particular error condition. This additional information may for example be in the form of audio, video, image and/or text content. According to an exemplary embodiment, the error file indicates a corrective action to be taken by the user for the particular error condition.

Next, at step 270, play back of the error file may be used by the user to resolve the error condition. For example, if the error file indicates that wireless network 40 is not available, as shown in FIG. 3, the user may take corrective action to ensure that wireless network 40 is available. As another example, if the error file indicates that no files are located or that desired file(s) are not available, the user may take corrective action to ensure that files are available from storage device(s) 50.

At step 280, a determination is made as to whether all error conditions are resolved. According to an exemplary embodiment, all error conditions are deemed to be resolved at step 280 when controller 24 determines that desired content has been located within wireless virtual file system 100 in the manner as previously described above in step 220. According to this exemplary embodiment, any error file (e.g., iconic representation 310) previously displayed at host device 10 disappears.

If the determination at step 280 is negative, process flow advances to step 290 where wireless virtual storage apparatus 20 retrieves another error file. According to an exemplary embodiment, controller 24 performs step 290 by retrieving from memory 26 an error file corresponding to another detected error condition. According to this exemplary embodiment, memory 26 may store multiple error files that each represents a different type of error condition. In this manner, wireless virtual storage apparatus 20 is capable of providing error notification and resolution guidance for various different types of error conditions. As previously indicated at step 250, controller 24 may also create error files or retrieve error files from a source other than memory 26, such as storage device(s) 50.

From step 290, process flow loops back to step 260 where host device 10 and wireless virtual storage apparatus 20 commence play back of the error file retrieved at step 290, as previously described. From step 260, process flow continues in the above-described manner until it is determined at step 280 that all error conditions are resolved.

Once all error conditions are resolved, process flow advances to step 230 where wireless virtual storage apparatus 20 provides the file name(s) corresponding to the desired content to host device 10 and a user is able to select a desired file. Then, at step 240, host device 10 and wireless virtual storage apparatus 20 commence playback of the desired content, as previously described herein.

Although the virtual storage apparatus is presented as wireless, the virtual storage apparatus can be connected to a wired network and presents itself as a network drive. In this embodiment, the virtual storage may not need a host interface and the network interface can be used to connect the virtual storage to either a wired or wireless network. When it is connected to a network, the virtual storage retrieves files of specific type(s) from all the accessible network storages. When the virtual storage is accessed, the virtual storage presents the name or identification and possibly other information of each file in a conventional manner to said network. The file appears to a user as one of the files stored in the virtual storage. The specific types of files can be specified by a user through a user interface (not shown) in a conventional manner or hard coded at the factory. If no file of one or more of the user-specified types is found, the virtual storage presents a file indicating an error. This error file is presented as one of the user-specified types and can be accessed in a similar way as a retrieved file of the same type.

As described herein, the present invention provides an apparatus and method for providing a dynamically-generated text, audio and/or video error file upon the occurrence of an error condition in a wireless virtual file system. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An apparatus, comprising:
a host interface for connecting to a host device;
a network interface for connecting to a wireless network;
a memory for storing one or more error files including at least one of audio and video content;
a controller coupled to said network interface for retrieving a name of a file stored in a storage device connected to said wireless network, and coupled to said host interface for transmitting said name of said file to said host device; and
wherein if no name is retrieved, said controller transmits a signal indicating an error condition and representing one of said stored error files to said host device via said host interface.

2. The apparatus of claim 1, wherein said signal indicates a reason for said error condition.

3. The apparatus of claim 2, wherein said reason is that said wireless network is not available.

4. The apparatus of claim 2, wherein said reason is that said file is not available.

5. The apparatus of claim 1, wherein said file stored in said storage device includes at least one of audio content and video content.

6. The apparatus of claim 1, wherein said stored error file transmitted by said controller indicates a corrective action to be taken for said error condition.

7. The apparatus of claim 6, wherein if no name is retrieved by said controller after said corrective action is taken, said controller transmits a second signal indicating a second error condition.

8. The apparatus of claim 7, wherein said second signal represents a second error file stored in said memory.

9. A method, comprising:
connecting an apparatus to a host device through a host interface of said apparatus and to a wireless network through a network interface of said apparatus;
retrieving, via said apparatus and through said network interface, a name of a file stored in a storage device connected to said wireless network;
transmitting said name of said file from said apparatus to said host device through said host interface; and
wherein:
if no name is retrieved, said apparatus transmits a signal indicating an error condition to said host device through said host interface;

said signal represents an error file stored in a memory of said apparatus; and said error file includes at least one of audio content and video content.

10. The method of claim 9, wherein said signal indicates a reason for said error condition.

11. The method of claim 10, wherein said reason is that said wireless network is not available.

12. The method of claim 10, wherein said reason is that said file is not available.

13. The method of claim 9, wherein said file stored in said storage device includes at least one of audio content and video content.

14. The method of claim 9, wherein said error file indicates a corrective action to be taken for said error condition.

15. The method of claim 14, wherein if no name is retrieved after said corrective action is taken, said apparatus transmits a second signal indicating a second error condition to said host device.

16. The method of claim 15, wherein said second signal represents a second error file stored in said memory of said apparatus.

17. A method, comprising:

connecting an apparatus to a network through a network interface of said apparatus;

retrieving, via said apparatus and through said network interface, a name of a file stored in a storage device connected to said network, and presenting said name of said file to a host device connected to said apparatus; and wherein:

if no name is retrieved, said apparatus provides an error file indicating an error condition to said host device; and said error file includes at least one of audio content and video content and is stored in a memory of said apparatus.

18. An apparatus, comprising:

a network interface for connecting to a network;

a controller coupled to said network interface for retrieving a name of a file stored in a storage device connected to said network, and presenting said name of said file to a host device connected to said apparatus; and wherein:

if no name is retrieved, said controller provides an error file indicating an error condition to said host device; and said error file includes at least one of audio content and video content and is stored in a memory of said apparatus.

* * * * *